United States Patent [19]

Pechacek

[11] 4,299,332
[45] Nov. 10, 1981

[54] PRESSURE VESSEL SEAL

[75] Inventor: Raymond E. Pechacek, Houston, Tex.

[73] Assignee: Hahn & Clay, Houston, Tex.

[21] Appl. No.: 63,825

[22] Filed: Aug. 6, 1979

Related U.S. Application Data

[63] Continuation-in-part of Ser. No. 13,963, Feb. 22, 1979, abandoned.

[51] Int. Cl.³ .................. F16J 15/06; B65D 53/02
[52] U.S. Cl. ...................................... 220/378; 220/3; 277/2; 277/138; 277/236; 277/12
[58] Field of Search ............... 220/3, 310, 344, 358, 220/378; 49/483, 489; 251/306; 285/332.2, 332.3; 277/2, 12, 138, 165, 166, 167.3, 186, 190, 191, 198, 236, 235 R, 235 A, 235 B, 180

[56] References Cited

U.S. PATENT DOCUMENTS

| 323,731 | 8/1885 | Phillips | 277/235 X |
|---|---|---|---|
| 1,790,957 | 2/1931 | Sykes | 220/358 |
| 2,257,213 | 9/1941 | Wolfrom | 220/3 X |
| 2,995,057 | 8/1961 | Nenzell | 277/180 X |
| 3,404,061 | 10/1968 | Shane et al. | 428/64 X |
| 3,429,581 | 2/1969 | Himmel | 277/180 |
| 3,567,258 | 3/1971 | Scaramucci | 277/236 X |
| 3,780,901 | 12/1973 | Pechacek | 220/378 X |
| 3,895,735 | 7/1975 | Clay | 220/5 A |
| 4,140,323 | 2/1979 | Jacobs | 277/235 B X |
| 4,155,561 | 5/1979 | Rudy et al. | 277/235 B X |

FOREIGN PATENT DOCUMENTS

| 799806 | 11/1968 | Canada | 220/3 |
|---|---|---|---|
| 1090904 | 10/1960 | Fed. Rep. of Germany | 220/3 |
| 1514383 | 1/1968 | France | 220/358 |
| 52155 | 11/1910 | Switzerland | 277/225 |
| 547359 | 8/1942 | United Kingdom | 220/378 |
| 735735 | 8/1955 | United Kingdom | 220/46 R |
| 952478 | 3/1964 | United Kingdom | 277/180 |

Primary Examiner—Robert S. Ward, Jr.
Attorney, Agent, or Firm—Pravel, Gambrell, Hewit, Kirk, Kimball & Dodge

[57] ABSTRACT

A pressure vessel seal for sealing a pressure vessel joint of a pressure vessel to prevent fluid migration between an interior wall and an interior surface of the pressure vessel joint including an annular seal ring, coatings with the annular seal ring for engaging the pressure vessel for effecting a sealable relation therebetween under varying pressure and temperature conditions, and coating reservoirs formed with the annular seal ring for receiving the coatings therein permitting the coatings to sealably engage the pressure vessel joint while storing the coatings for enhanced spring back of the coatings under such varying pressure and temperature conditions.

19 Claims, 7 Drawing Figures

PRESSURE VESSEL SEAL

CROSS-REFERENCE TO RELATED APPLICATION

This application is a continuation-in-part of applicant's copending application Ser. No. 13,963, filed Feb. 22, 1979, now abandoned.

TECHNICAL FIELD

The field of this invention relates to high pressure seals, particularly for the type used for sealing joints of a high pressure vessel.

PRIOR ART

High pressure gaskets or seals encounter numerous difficulties in insuring a sealable relation between the seal and the pressure vessel during operations of varying pressures. For example, if a high pressure gasket or seal is used on a rough sealing surface, the seal must accordingly be pliable or subject to plastic deformation in order to conform to the irregular contact sealing surfaces in such a fashion to affect an appropriate seal. However, gaskets that are typically pliable are not suitable for high temperature operations inasmuch as they are typically limited to temperatures of approximately 450° Fahrenheit. On the other hand, for temperature conditions that exceed the capacity of such pliable gaskets, typically metal gaskets are used. Such metal gaskets however require extremely fine surface faces that are difficult to achieve and even more difficult to maintain and service, irrespective of the significant increase in costs encountered in producing such mirror-like surfaces.

As a compromise, metal gaskets sealing on metal surfaces can be manufactured to tolerate less than polished sealing surfaces when coated with a relatively soft coating material such as nickel, copper, gold, siver and the like. Such coatings are sufficiently plastic and pliable to fill in the irregularities of the sealing surface where a seal must necessarily be accomplished. In these circumstances, the coating must be thin and the amount of imperfection at irregularities permitted on the sealing surfaces must be small. Since such coatings are expensive, only small amounts of such coating materials may be used in order to minimize costs.

Some prior art high pressure seals include those types disclosed in U.S. Pat. Nos. 3,339,787 and 3,780,901, which disclose various types of seals for effectuating a fluid-tight relation within a high pressure vessel. Other types of seals and configurations used within high pressure vessels are shown within U.S. Pat. Nos. 3,895,735, 4,009,798, and 4,054,224. However, so far as known, there is presently no inexpensive to manufacture, high pressure seal capable of withstanding high temperatures and pressures yet capable of being used on non-mirror-like, irregular sealing surfaces, while not requiring accurate thickness control of typically expensive coatings.

SUMMARY OF THE INVENTION

It is an object of this invention to provide a new and useful pressure vessel seal capable of being used in high temperatures and under high pressures that will tolerate surface imperfections of the sealing surface, yet further are inexpensive to produce and manufacture.

The pressure vessel seal of the present invention is for sealing a pressure vessel joint of a pressure vessel and includes an annular ring, a coating with the annular ring for engaging the pressure vessel for effectuating a sealable relation there between under varying pressure conditions, with the annular seal ring having first and second outer annular surfaces disposed adjacent to the pressure vessel, with coating reservoirs formed with the outer annular surfaces adjacent the extremeties thereof for receiving the coatings therein for permitting the coatings to sealably engage the pressure vessel joint while storing the coating for enhanced spring back of the coating under varying pressure conditions.

DESCRIPTION OF THE PREFERRED EMBODIMENT

Figure 1:
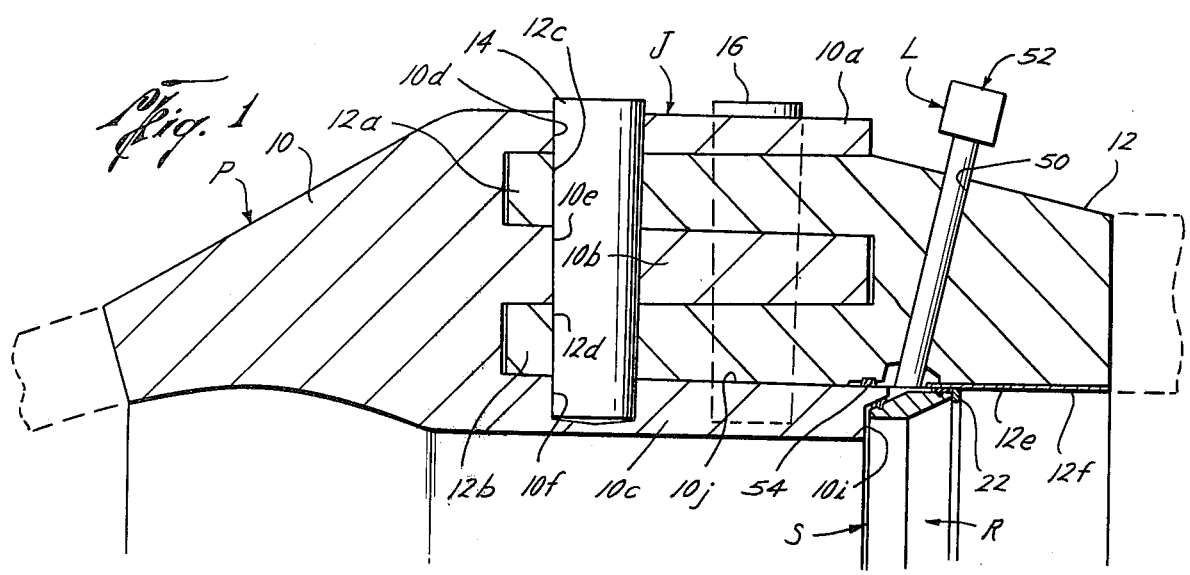
FIG. 1 is a sectional view of a pressure vessel showing a pressure vessel joint with the pressure vessel seal of the present invention in place adjacent the pressure vessel joint and further showing the leak detector means of the present invention.

In the drawings, the letter S designates generally the pressure vessel seal S of the present invention. The pressure vessel seal S is for sealing a pressure vessel joint J of a pressure vessel P to prevent fluid migration therebetween the pressure vessel seal S and the pressure vessel P. The pressure vessel seal S includes generally an annular seal ring R, coating means C with the annular seal ring R, and coating reservoir means M formed with the annular seal ring R.

Figure 2:
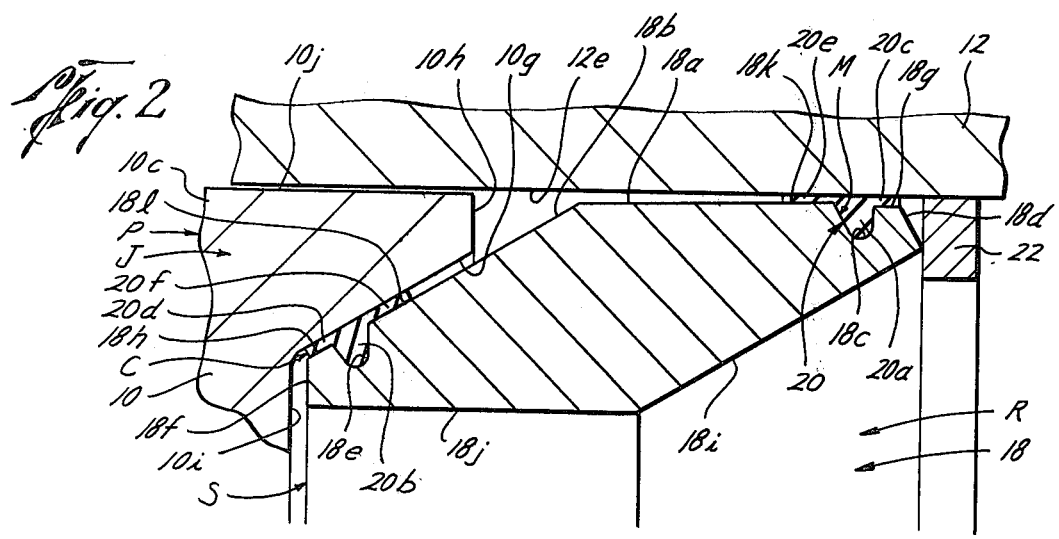
FIG. 2 is an enlarged, sectional view of the pressure vessel seal of the present invention shown in FIG. 1.

The pressure vessel seal S of the present invention is adapted to be used within a pressure vessel P. Such pressure vessels P are typically made up in such a fashion that there is a pressure vessel joint J as best seen in FIG. 1. The pressure vessel joint J of the pressure vessel P may include the pressure vessel sections 10, 12 which are of a generally cylindrical shape. Pressure vessel section 10 may include joint fingers 10a, 10b, 10c while pressure vessel section 12 includes joint fingers 12a, 12b. Preferably joint fingers 10a, 10b, 10c, 12a, 12b are of a substantially compatible configuration in cross section and are configured such that the joint finger 12a fits between joint fingers 10a, 10b and joint finger 12b fits between joint finger 10b, 10c. Preferably, joint fingers 12a, 12b are of a slight taper such that as the pressure vessel sections 10, 12 are drawn together, the joint fingers are wedged into one another. Appropriate vessel pins such as 14, 16 are disposed within a suitably formed openings in the pressure vessel sections 10, 12 to secure the pressure vessel sections 10, 12 together. The vessel pins 14, 16 are also of a slight, tapered configuration which enhances the drawing together of the vessel sections 10, 12. For example, vessel pin 14 may be placed through opening 10d in joint finger 10a, opening 12c in joint finger 12a, opening 10e in joint finger 10b, into opening 12d formed in joint finger 12b, thereinto opening 10f formed within joint finger 10c of the pressure vessel P for securing the pressure vessel joint J together. The pressure vessel section 12 includes an interior wall 12e which may include a protective layer 12f mounted adjacent thereto with such protective layer 12f adapted to protect the interior wall 12e of pressure vessel section 12 from the effects of the contents within the pressure vessel P. Pressure vessel section 10 is preferably formed having an interior surface 10g as best seen in FIG. 2 disposed between annular surfaces 10h, 10i, with abutting surface 10j formed adjacent to annular surface 10h and adapted to be in close proximity to interior wall 12e.

The pressure vessel seal S of the present invention includes an annular seal ring R. The annular seal ring R includes ring 18. The ring 18 is preferably formed having a first outer annular surface 18a adapted to be disposed adjacent the interior wall 12e of pressure vessel section 12 of the pressure vessel joint J and a second outer annular surface 18b formed adjoining the first outer annular surface 18a and adapted to be disposed adjacent the interior surface 10g of the pressure vessel joint J. A first cavity 18c is formed in the first outer annular surface 18a adjacent outer extremity 18d and a second cavity 18e is formed in the second outer annular surface 18b adjacent the outer extremity 18f. A first undercut portion 18g is formed in the first outer annular surface 18a between the first cavity 18c and the outer extremity 18d of the first outer annular surface 18a. A second undercut portion 18h is formed from the second outer annular surface 18b between the second cavity 18e and outer extremity 18f of the second outer annular surface 18b. A first inner annular surface 18i is preferably formed adjacent outer extremity 18d with second inner annular surface 18j formed between the first inner annular surface 18i and outer extremity 18f. As a consequence, the annular seal ring R of the present invention is of a substantially quadrilateral configuration having two truncated end portions at the outer extremities 18d, 18f, with such quadrilateral configuration being substantially of that of a parallelogram.

Figure 3:
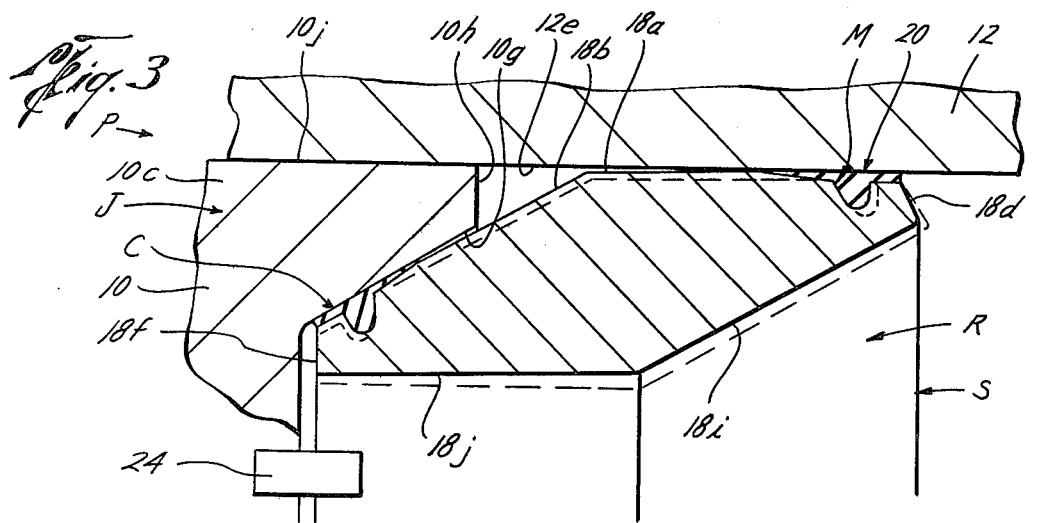
FIG. 3 is an enlarged, sectional view of the pressure vessel seal of the present invention similar to FIG. 2, however shown being fully deflected because of high pressure loading within the pressure vessel.

It is preferable that the ring 18 be formed of any suitable high strength material such as stainless steel, any suitable alloy, or the like, dependent upon the environment to which the pressure vessel seal S of the present invention is subjected to within the pressure vessel P. This contemplates selecting materials that must withstand corrosive effects, high temperatures, as well as high pressures as the situation demands. However, the material should be able to flex slightly under high pressures without demonstrating any metal fatigue, cracking or the like, as discussed more fully hereinbelow. The annular seal ring R of the pressure vessel seal S is formed such that the first outer annular surface 18a is at an angle with respect to the interior wall 12e of the pressure vessel joint J when the pressure vessel P is under minimal pressure conditions and that the second outer annular surface 18b of the annular seal ring R is at an angle with respect to the interior surface 10g of the pressure vessel joint J when the pressure vessel P is under minimal pressure conditions. This mating angle between the annular seal ring R and the corresponding sealing surfaces 10g, 12e of the pressure vessel joint J results in a minimum portion of the annular seal ring R contacting the pressure vessel joint J initially, hence requiring a lower preload while at high pressures. Thus, the annular seal ring R can flex and bend to lower bearing pressures adjacent the undercut areas 18g, 18h of the ring 18, as shown in FIG. 3, and discussed more fully hereinbelow.

The pressure vessel seal S of the present invention further includes coating means C. The coating means C is with the annular seal ring R for engaging the pressure vessel P for affecting a sealable relation therebetween under varying pressure conditions. The coating means C includes coating designated generally as 20. The coating 20 includes first and second cavity coatings 20a, 20b disposed within first and second cavities 18c, 18e of the annular seal ring R, respectively. The coating means C further includes first and second undercut coatings 20c, 20d which overlie the first and second undercut portions 18g, 18h, respectively. Furthermore, the coating means C includes first and second annular surface coatings 20e, 20f which overlie portions 18k, 18l of the first and second outer annular surfaces 18a, 18b, respectively adjacent first and second cavities 18c, 18e. While any suitable coating means C may suffice for coating 20, it is preferred that the material used be an impregnated graphite of the type covered by U.S. Pat. No. 3,404,061. This impregnated graphite material is not only sensitive to bearing pressure and therefore contact pressure may be controlled but also has a limited amount of "spring back." The spring back is a function of the resiliency of the coating 20 such that after severe compression, total plastic deformation will not occur but to the contrary, the coating 20 will tend to spring back to its original configuration without significant damage to the structural integrity thereof. The impregnated graphite of the aforementioned patent has a characteristic that the larger the volume of the material the greater the spring back that the particular material will have. Furthermore, the coating 20 of an impregnated graphite acts to be self-lubricating which further enhances the life of the coating means C thereof. The coating 20 further is capable of withstanding high temperatures yet is pliable and subject to deformations which may occur because of irregular surfaces on the interior wall 12e or interior surface 10g of the pressure vessel P; however, the spring back feature allows adaptation to such irregularities without destroying the structural integrity of the coating 20. Such a coating 20 then is capable of filling in the irregularities of a nonpolished, irregular surface to affect a seal therebetween as discussed more fully hereinbelow.

Figure 4:
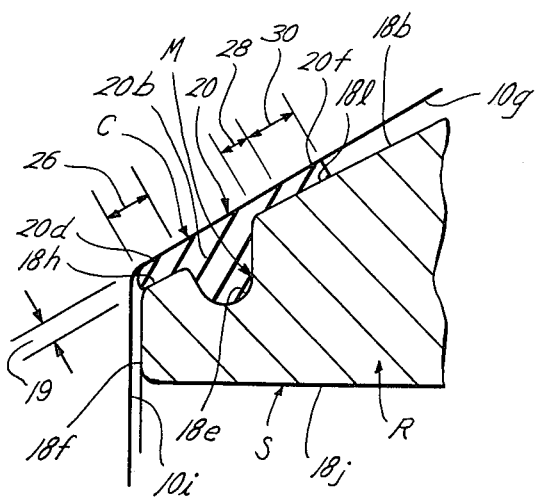
FIG. 4 is a partial, sectional view of the extremity of the pressure vessel seal of the present invention, as assembled, with a no pressure environment within the pressure vessel.

The pressure vessel seal S of the present invention further includes coating reservoir means M formed with the first and second outer annular surfaces 18a, 18b adjacent the respective outer extremities 18d, 18f thereof for receiving the coating means C therein, for permitting the coating means C to sealably engage the pressure vessel joint J while storing the coating means C for enhanced spring back of the coating means C under varying pressure conditions. The coating reservoir means M includes the aforementioned first and second cavities 18c, 18e in addition to the first and second undercut portions 18g, 18h all of which allow the storage of a reservoir of coating means C. The first and second undercut coatings 20c, 20d are of a greater cross-sectional depth 19 than the cross-sectional depth of the first and second annular surface coatings 20e, l 20f (FIG. 4). Furthermore, the first and second cavity coatings 20a, 20b are of greater cross-sectional depth than either the cross-sectional depth of the first and second undercut coatings 20c, 20d or the cross-sectional depth of the first and second annular surface coatings 20a, 20b, for providing a reservoir of coating means C.

In the use and operation of the pressure vessel seal S of the present invention, the pressure vessel seal S is inserted into a pressure vessel section 12 prior to makeup of the pressure vessel joint J. The pressure vessel seal S is inserted until an appropriate stop 22 (FIGS. 1, 2), which may be of an annular configuration, is engaged thus limiting the extent to which the pressure vessel seal S of the present invention may be inserted thereinto the pressure vessel P. Alternatively, the pressure vessel seal S may be affixed to pressure vessel section 10 by an appropriate attachment, such as attachment 24 (FIG. 3) for securing the pressure vessel seal S thereto.

After the pressure vessel seal S is inserted within the pressure vessel P, the pressure vessel joint J is made up and locked with vessel pins 14, 16 as described fully hereinabove. During this procedure, there is no pressure within the pressure vessel P. Under this no pressure condition, the relationship of the pressure vessel seal S with the pressure vessel P is shown in FIG. 4. In this condition, the coating means C including second undercut coating 20d, second cavity coating 20b, and second annular surface coating 20f, are in contact with the interior surface 10g of pressure vessel section 10 of the pressure vessel P producing sufficient contact pressure such that there exists a high bearing pressure area 26 adjacent the undercut portion 18h and undercut coating 20d which is of sufficient contact pressure to effect a low pressure seal in area 26. A low bearing pressure area 28 exists adjacent cavity 18e and a pressure area 30 of no bearing pressure exists adjacent to low bearing pressure area 28. As a consequence, the major portion of sealing to affect the low pressure seal occurs in the undercut coating 20d.

Figure 5:
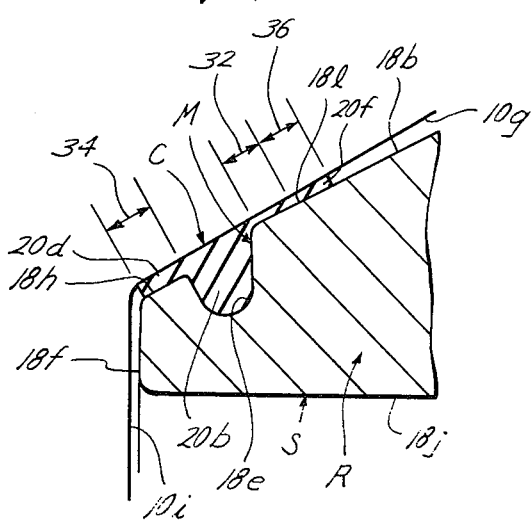
FIG. 5 is a partial, sectional view of the extremity of the pressure vessel seal of the present invention, with a low pressure environment within the pressure vessel.

As pressure is applied, the pressure vessel seal S of the present invention is forced against the corresponding mating surfaces of the pressure vessel P, being particularly the interior surface 10g and interior wall 10e, resulting in the structure illustration FIG. 5. As shown in FIG. 5, the highest bearing area 32 exists in the portion adjacent to the cavity 18e whereas the bearing pressure areas of 34, 36 experience a bearing pressure of a lesser magnitude. Furthermore, the bearing pressure in the undercut coating 20d in bearing pressure area 34 experiences a lower bearing pressure because the thickness 19 of the undercut coating 20d is greater than that corresponding to the annular surface coating 20f adjacent bearing pressure area 36.

Figure 6:
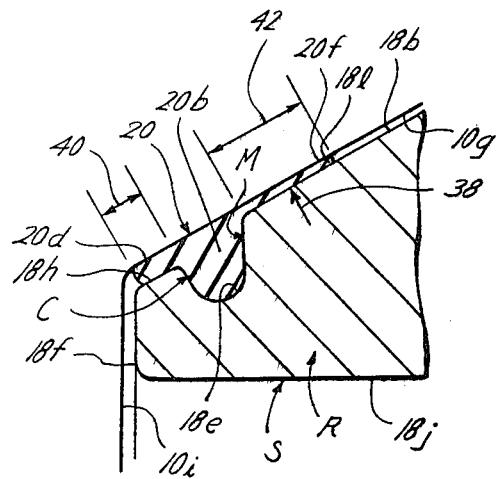
FIG. 6 is a partial, sectional view of the extremity of the pressure vessel seal of the present invention, with a high pressure environment within the pressure vessel; and, FIG. 7 is a partial, sectional view of the extremity of the pressure vessel seal of the present invention, with a no pressure environment within the pressure vessel, after loading the pressure vessel seal with high pressure as shown in FIG. 6.

As pressure within the pressure vessel P is increased to maximum design load, the pressure vessel seal S of the present invention bends or flexes as shown in FIG. 3 from its original configuration shown in dotted lines to that where the first outer annular surface 18a engages interior wall 12e and second outer annular surface 18b engages interior surface 10g in direct metal to metal contact. The bending or flexing of the pressure vessel seal S causes a rotation thereof about pivot point 38 (FIG. 6) which tends to relieve bearing pressure in the undercut bearing pressure area 40, thus preventing the undercut coating 20d from overloading. Overloading of the coating means C can cause the coating means C to lose its spring back and destroy the structural integrity thereof to consequently destroy the sealing effectiveness of the pressure vessel seal S of the present invention. Thus, the highest bearing pressure area within the coating means C is experienced in pressure area 42 with pressure area 40 experiencing a much lesser amount of pressure. Under such maximum design load conditions, the greatest extent of the high pressure seal is effectuated in pressure area 42 adjacent pivot point 38 with the metal to metal contact of the first outer annular surface 18a with interior wall 12e and second outer annular surface 18b with interior surface 10g with the coating means C providing relief from the extremes of the pressure encountered. It should be understood that the pivot point 38 in actuality represents an annular point of contact about the enire annular seal ring R and is not located only at one discrete point but about the entire ring 18.

Figure 7:
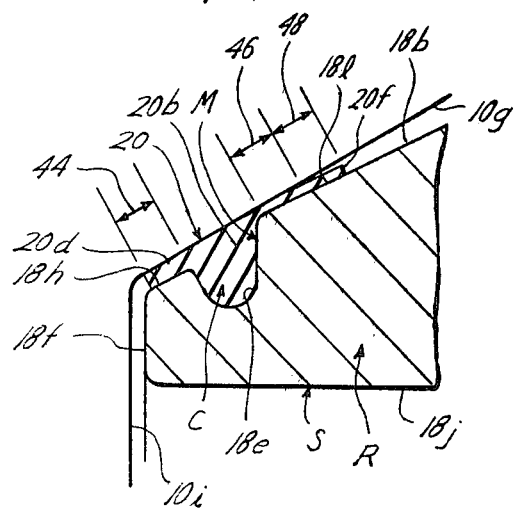

When the pressure is lowered or removed, the annular seal ring R of the pressure vessel seal S flexes back to its original shape. However, as shown in FIG. 7, the annular surface coating 20f adjacent the pivot point area is in a compressed state and has a small spring back due to a combination of a limited amount of coating means C experiencing the very high bearing loads placed upon it during maximum design load pressures. The undercut coating 20d, however has a much greater spring back because it was isolated from being subjected to maximum design load pressures due to the bending of the annular seal ring R about pivot point 38 in engaging the pressure vessel joint J, in addition to the thickness 19 of the undercut area providing a greater volume of coating means C, which consequently provides a greater spring back potential. After release of maximum design load pressures as shown in FIG. 7, the high bearing pressure area 44 is adjacent the undercut coating 20d, much as originally experienced in FIG. 4, whereas pressure area 46 experiences low bearing pressure while pressure area 48 experiences no bearing pressure at all. Thus, with area 44 maintaining contact with interior surface 10g, a sealable relation is maintained.

Although FIGS. 4 through 7 detail the various bearing pressure areas under various pressure loadings within the pressure vessel P for the components adjacent the outer extremity 18f of the ring 18, similar bearing pressures are experienced by the components adjacent extremity 18d under the loading conditions detailed in FIGS. 4–7. Therefore, a portion of the coating means C is disposed on the annular seal ring R interior to the coating reservoir means M for forming an annular pivot point 38 about the annular seal ring R wherein the annular seal ring R pivots about the pivot point 38 under high pressure conditions within the pressure vessel P to effectuate high pressure sealing between the first outer annular surface 18a and the interior wall 12e and between the second outer annular surface 18b and the interior surface 10g without such high pressures adversely effecting the coating means C. Thus, the first and second undercut coatings 20c, 20d are protected from damage during high pressure loading of the annular seal ring R by flexure thereof about the annular pivot point 38 (and a similar such pivot point adjacent extremity 18d), while the first and second undercut coatings 20c, 20d provide low pressure sealing during minimal pressure loadings of the pressure vessel P.

Under high pressure or high temperature conditions, either individually or a combination thereof, a stretching or straining occurs in the pressure vessel sections 10, 12. This stretching or straining tends to localize, for example, in the area of joint fingers 12a, 12b to the right of the vessel pin 14 as illustrated in FIG. 1. Under such high temperature and/or pressure conditions, this area tends to shift or stretch such that a separation between the pressure vessel sections 10, 12 may occur. Such a separation of pressure vessel sections 10, 12 in the prior art would result in a separation of the gasket typically sealing such vessel sections 10, 12 due to such stretching or straining, thus causing a resultant leak such as between joint finger 12b and abutting surface 10j.

The pressure vessel seal S of the present invention will effect a fluid tight seal irrespective of movement between the annular seal ring R and pressure vessel sections 10, 12 of the pressure vessel P. For example, under high pressure conditions, internal pressure forces within the pressure vessel P urge the seal ring R radially against interior surface 10g and interior wall 12e while also producing sufficient force adjacent the outer extremities 18d, 18f of the ring 18 to ensure a sealable relation therebetween the annular seal ring R and the pressure vessel sections 10, 12. Relative motion may take place between the pressure vessel sections 10, 12 adjacent the pressure vessel joint J of the pressure vessel P, yet the annular seal ring R may maintain a sealable relation, particularly in view of the nature of the coating C. The impregnated graphite which is preferred for the coating 20 in addition to having the aforementioned "spring-back" acts to be self-lubricating which in turn allows such relative movement between the pressure vessel sections 10, 12, yet maintain a fluid tight relation even in combustion with high pressures and/or high temperatures. Thus, the annular seal ring R of the present invention encompasses usages thereof wherein the seal ring R itself may flex radially in response to high pressures within the pressure vessel P while also being capable of maintaining such a sealable relation during straining or stretching of the pressure vessel sections 10, 12 adjacent the pressure vessel joint J.

Leak detector means L with the pressure vessel P may be used in conjunction with the pressure vessel seal S of the present invention. The leak detector means L is with the pressure vessel P adjacent the pressure vessel joint J for detecting fluid migration between the coating means C and the pressure vessel P, should such occur. Preferably, the leak detector means L includes a passageway 50 (FIG. 1) formed in the pressure vessel P adjacent the pressure vessel joint J. Monitoring means designated generally as 52 communicates with the passageway 50 for monitoring any leakage through the passageway 50. A backup seal 54 is mounted with the pressure vessel P between the interior surface 12e and the pressure vessel joint J to restrain fluid leakage about the annular seal ring R, as necessary. Specifically, the backup seal 54 is adapted to be disposed between interior surface 12e and abutting surface 10j to prevent any fluid flow therebetween, thus directing any fluid leaking around and between the coating means C and the pressure vessel P into passageway 50 for detection by the monitoring means 52. The monitoring means 52 may include visual detectors, gas or chemical monitors, analyzers, and/or mass spectrometers or any other suitable device for detecting leakage of the contents of the pressure vessel P.

Should an undetected leak of corrosive liquids and/or gases occur severe damage could be caused in the pressure vessel joint J before such a leak could be detected. This is particularly true because the joint fingers-vessel pin arrangement of the pressure vessel joint J would require a leaking corrosive liquid or gas to follow a long circuitous path to reach the outside of the pressure vessel joint J, which could cause severe draining even in the case of the most minute leaks. Accordingly should even the slightest of leaks occur about the annular seal ring R, such leakage would be directed to the monitoring mean 52 from passageway 50 prior to damaging within the pressure vessel joint J.

Alternatively, the passageway 50 allows a means of checking the contact of the coating means C of the annular seal ring R of the pressure vessel seals of the present invention under a no pressure condition, by the application of pressure from an outside source, through the passageway 50 into the area bounded by the pressure vessel seal S, interior wall 12e, annular surface 10h and backup seal 54. The application of a specified pressure if maintained indicates no reverse leakage of the pressure vessel seal S of the present invention upon the initial assembly with the pressure vessel P.

It should also be appreciated that the pressure vessel seal S of the present invention may also be used with a pressure vessel joint J of a typical bolt-nut configuration (not shown), so long as such pressure vessel joint J has appropriate surfaces such as 10g, 12e for sealably engaging the pressure vessel seal S.

Thus, the pressure vessel seal S of the present invention results in a self-energized, that is pressure actuated, sealing system that requires little if any pre-load to affect a seal. The coating means C is such that it is self-lubricating and may be applied generously to the surface of the annular seal ring R, allowing the toleration of large surface imperfections adjacent the pressure vessel joint J while being inexpensive to manufacture as well as being capable of being used multiple times, due to the variable contact surface pressure of the pressure vessel seal S as pressures within the pressure vessel P are varied. The spring back of the coating means C and the different mating angles between the annular seal ring R and the pressure vessel P result in preloading the pressure vessel seal S for initial sealing and the lowering of bearing pressure areas adjacent the undercut portions of the pressure vessel seal S under high pressures due to flexing thereof. Further, the pressure vessel seal S is capable of maintaining a fluid tight relation with the pressure vessel P even though the pressure vessel P experiences straining and/or stretching adjacent the sealing areas of the pressure vessel seal S due to high temperatures and/or pressures.

The foregoing disclosure and description of the invention is illustrative and explanatory thereof and various changes in the size, shape, and materials, as well as in the details of the illustrated construction, may be made within the scope of the appended claims without departing from the spirit of the invention.

I claim:

1. A pressure vessel seal for sealing a pressure vessel joint of a pressure vessel having high internal pressures or temperatures therein causing strain in the pressure vessel joint, the pressure vessel seal for preventing fluid migration between an interior wall and an interior surface of the pressure vessel joint, comprising:

an annular seal ring;

coating means with said annular seal ring for engaging the pressure vessel for effecting a sealable relation therebetween when the pressure vessel joint strains under the high pressures or temperatures encountered within the pressure vessel;

said annular seal ring having:

a first outer annular surface adapted to be disposed adjacent the interior wall of the pressure vessel joint;

a second outer annular surface formed adjoining said first outer annular surface and adapted to be disposed adjacent the interior surface of the pressure vessel joint;

coating reservoir means formed with said first and second outer annular surfaces adjacent the respective outer extremities thereof for receiving said coating means therein for permitting said coating means to sealably engage the pressure vessel joint during the high internal pressures or temperatures while storing said coating means for enhanced spring back of said coating means under varying pressure conditions; and, said first and second outer annular surfaces are formed having undercut portions between said coating reservoir means and said outer extremities thereof for receiving coating means to enhance a sealing relation between said annular seal ring and the pressure vessel joint.

2. The pressure vessel seal of claim 1, wherein:
said coating means is formed having a lubricant impregnated therewith.

3. A pressure vessel seal for sealing a pressure vessel joint of a pressure vessel to prevent fluid migration between an interior wall and an interior surface of the pressure vessel joint, comprising:

an annular seal ring;

coating means with said annular seal ring for engaging the pressure vessel for effecting a sealable relation therebetween under varying pressure conditions;

said annular seal ring having:

a first outer annular surface adapted to be disposed adjacent the interior wall of the pressure vessel joint;

a second outer annular surface formed adjoining said first outer annular surface and adapted to be disposed adjacent the interior surface of the pressure vessel joint;

coating reservoir means formed with said first and second outer annular surfaces adjacent the respective outer extremities thereof for receiving said coating means therein for permitting said coating means to sealably engage the pressure vessel joint while storing said coating means for enhanced spring back of said coating means under varying pressure conditions; and, said first and second outer annular surfaces are formed having undercut portions between said coating reservoir means and said outer extremities thereof for receiving coating means to enhance a sealing relation between said annular seal ring and the pressure vessel joint.

4. The pressure vessel seal of claim 3, wherein said coating reservoir means includes:

a first cavity formed in said first outer annular surface adjacent said outer extremity thereof for receiving said coating means therein; and, a second cavity formed in said second outer annular surface adjacent said outer extremity thereof for receiving said coating means therein.

5. The pressure vessel seal of claim 4, wherein said undercut portions include:

a first undercut portion between said first cavity and said outer extremity of said first outer annular surface; and, a second undercut portion between said second cavity and said outer extremity of said second outer annular surface.

6. The pressure vessel seal of claim 4, wherein:

said coating means includes first and second cavity coatings disposed within said first and second cavities of said annular seal ring, respectively;

said coating means includes first and second undercut coatings which overlie said first and second undercut portions, respectively; and, said coating means includes first and second annular surface coatings which overlie a portion of said first and second outer annular surfaces, respectively, adjacent said first and second cavities, respectively.

7. The pressure vessel seal of claim 6, wherein:
said first and second undercut coatings are of greater cross-sectional depth than the cross-sectional depth of said first and second annular surface coatings.

8. The pressure vessel seal of claim 6, wherein:
said cavity coatings are of greater cross-sectional depth than the cross-sectional depth of said undercut coatings and said annular surface coatings, for providing a reservoir of coating means.

9. The pressure vessel seal of claim 3, wherein:
said first outer annular surface of the annular seal ring is at an angle with respect to the interior wall of the pressure vessel joint when the pressure vessel is under minimal pressure conditions; and, said second outer annular surface of the annular seal ring is at an angle with respect to the interior surface of the pressure vessel joint when the pressure vessel is under minimal pressure conditions.

10. The pressure vessel seal of claim 9, wherein:
said coating means is disposed on said annular seal ring interior to said coating reservoir means for forming annular pivot points about said annular seal ring wherein said annular seal ring pivots about said annular pivot points under high pressure conditions within the pressure vessel to effectuate high pressure sealing between said first outer annular surface and the interior wall and between said second outer annular surface and the interior surface without such high pressures adversely effecting said coating means.

11. The pressure vessel seal of claim 10, wherein said coating reservoir means includes:

a first cavity formed in said first outer annular surface adjacent said outer extremity thereof for receiving coating means therein; and, a second cavity formed in said second outer annular surface adjacent said outer extremity thereof for receiving said coating means therein.

12. The pressure vessel seal of claim 11, wherein said undercut portions include:

a second undercut portion between said first cavity and said outer extremity of said first outer annular surface; and, a second undercut portion between said second cavity and said outer extremity of said second outer annular surface.

13. The pressure vessel seal of claim 11, wherein:
said coating means includes first and second cavity coatings disposed within said first and second cavities of said annular seal ring, respectively;
said coating means includes first and second undercut coatings which overlie said first and second undercut portions, respectively; and,
said coating means includes first and second annular surface coatings which overlie a portion of said first and second outer annular surfaces, respectively, adjacent said first and second cavities, respectively.

14. The pressure vessel seal of claim 13, wherein:
said annular pivot points occur adjacent said first and second annular surface coatings such that said first and second annular surface coatings are subjected to high bearing pressure from said annular seal ring during high pressure loading of the pressure vessel.

15. The pressure vessel seal of claim 14, wherein:
said first and second undercut coatings are protected from damage during high pressure loading of said annular seal ring by flexure thereof about said annular pivot points.

16. The pressure vessel seal of claim 13, wherein:
said first and second undercut coatings provide lower pressure sealing during minimal pressure loadings of the pressure vessel.

17. The pressure vessel seal of claim 3, further including:
leak detector means with the pressure vessel adjacent the pressure vessel joint for detecting fluid migration between said coating means and the pressure vessel.

18. The pressure vessel seal of claim 17, wherein said leak detector means includes:
a passageway formed in the pressure vessel adjacent the pressure vessel joint; and,
monitoring means in communication with said passageway for monitoring leakage through said passageway.

19. The pressure vessel seal of claim 18, further including:
a back-up seal mounted with the pressure vessel between the interior surface and the pressure vessel joint to restrain fluid leakage about said annular seal ring, as necessary.

* * * * *